United States Patent

Larsen et al.

[15] 3,674,664
[45] July 4, 1972

[54] METHOD OF PREPARING CHLOROACETYL CHLORIDE

[72] Inventors: Eric R. Larsen, Midland, Mich.; Albert Kent Keller, Punta Gorda, British Honduras; Raymond A. Plepys, Midland, Mich.

[73] Assignee: The Dow Chemical Company, Midland, Mich.

[22] Filed: March 6, 1970

[21] Appl. No.: 17,292

Related U.S. Application Data

[63] Continuation-in-part of Ser. No. 804,689, March 5, 1969, abandoned.

[52] U.S. Cl.................204/158 R, 204/158 HE, 260/544 Y
[51] Int. Cl.......................................B01j 1/10, C07c 51/58

[58] Field of Search..............204/158 R, 158 HE; 260/544 Y

[56] References Cited

FOREIGN PATENTS OR APPLICATIONS 746,451   7/1944   Germany................................204/158

Primary Examiner—Howard S. Williams
Attorney—Griswold and Burdick, J. Roger Lochhead and C. E. Rehberg

[57] ABSTRACT

A method of preparing chloroacetyl chloride which comprises reacting by contacting in the vapor phase, at a temperature of about 20° to 350° C., vinylidene chloride with $O_2$ in the presence of a free radical initiator.

11 Claims, No Drawings

METHOD OF PREPARING CHLOROACETYL CHLORIDE

This application is a continuation-in-part of copending application, Ser. No. 804,689, filed Mar. 5, 1969, now abandoned.

BACKGROUND OF THE INVENTION

It is well known in the art that olefins of the type

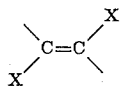

wherein X is a halogen, are oxidized by elemental oxygen (air) in the presence of ultraviolet light and $Cl_2$ or $Br_2$ to yield the corresponding haloacetyl halide, i.e.,

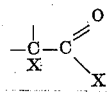

However, the formation of chloroacetyl chloride from the oxidation of vinylidene chloride is not so widely reported. Rather, the oxidation of vinylidene chloride yields a peroxide along with polymer. R. C. Reinhardt (*Industrial and Engineering Chemistry*, 35, 423 (1943)), teaches that in the liquid phase the presence of large amounts of air, or oxygen, along with light, leads to the formation of abundant amounts of peroxide which separate out with the polymer, which is insoluble in the monomer. This polymer, containing the peroxide, readily detonates when it is allowed to dry. Reinhardt reports also that the ultimate reaction products formed by the liquid phase oxidation of vinylidene chloride are $CH_2O$, $COCl_2$ and HCl.

German Pat. No. 746,451 (published July 29, 1944) teaches a method of producing chloroacetyl chloride by the liquid phase oxidation of vinylidene chloride in the presence of $Cl_2$ and actinic light. The method requires, however, measures which prevent the formation of polymers contaminated with peroxide, for the reasons outlined above, i.e., explosions.

Therefore, the formation of chloroacetyl chloride from vinylidene chloride has not been commercialized for reasons of safety hazards in the known processes to date.

It has now been discovered that chloroacetyl chloride can be safely produced by the vapor phase oxidation of vinylidene chloride.

SUMMARY OF THE INVENTION

The instant invention is a method of preparing chloroacetyl chloride which comprises reacting by contacting in the vapor phase, at a temperature of about 20° to 350° C., vinylidene chloride with $O_2$, in the presence of a free radical initiator.

A molar ratio of vinylidene chloride/$O_2$ of 3/1 to 1/20 is suitable for the process of this invention, while a ratio of 1/1 to 1/5 is preferred. Insufficient $O_2$ results in low conversion of vinylidene chloride, with a corresponding decrease in yield, and increase in polymer formation. However, large excesses of $O_2$ are not detrimental except that the through-put for a given reactor is decreased. Atmospheric air is also suitable.

The ratio of vinylidene chloride to free radical initiator is dependent on the reactivity of the radicals. Reactive radicals such as halogen atoms, alkyl radicals and the like are effective in lower concentrations than relatively stable radicals, such as $NO_2$. In general, higher concentrations of radicals will facilitate reaction while low concentrations of radicals or radical precursors will be less effective. Likewise, the contact time of radicals with the reacting system (vinylidene chloride-oxygen) will affect conversion. A short contact time will be detrimental to yield, whereas long contact times will increase yield with the additional possibility of forming by-products by the reaction of radicals with the product, chloroacetyl chloride. The contact time can be easily optimized by varying the rate of input of starting materials into the reactor while monitoring conversion of vinylidene chloride and yield of chloroacetyl chloride.

While temperatures of reaction of about 20° to 350° C. are suitable for this invention, 100° to 200° C. is preferred. As is generally expected in vapor phase reactions, increasing pressure increases the effective through-put of the reactor. While atmospheric pressure is convenient, two or three atmospheres pressure will increase the rate of reaction substantially.

All the common free radical initiators are generally suitable for the method of this invention. Exemplary of these initiators are halogens, such as $Cl_2$, $Br_2$, $F_2$ and $I_2$; mixtures of halogens, such as $Cl_2 + Br_2$; and halogen compounds, such as $ClF_3$ and BrCl. It is necessary to utilize ionizing radiation (I.R.), such as ultraviolet wavelengths, with $Cl_2$, $Br_2$ and $I_2$. Further examples of suitable initiators include phosgene plus I.R.; $CCl_4$ plus I.R.; $BrCCl_3$ plus I.R.; $NO_2$; NO; and ionizing radiation alone, including gamma, beta and X-rays.

The method taught herein can suitably be run in a batch or continuous fashion. A continuous reaction is preferable.

SPECIFIC EMBODIMENTS

The reactions were conducted by metering vapors of vinylidene chloride ($V_2$ in table headings) into a suitable reactor. Oxygen and free radicals or free radical precursors were metered as vapors into the same reactor either separately or premixed. When ionizing radiation was used as an initiator (see Example 10 below), it was not necessary to have an additional source of free radicals apart from the vinylidene chloride and oxygen, although it may be advantageous to do so (see Example 11 below). The temperature in the reaction zone, except for Examples 10–12, was determined by means of thermocouples placed inside sealed wells in the reactor.

The reactor for Examples 1, 2 and 4 (below) consisted of a Pyrex glass tube approximately 35 cm. long and 3 cm. i.d. This tube had provisions for cooling with circulating cold water in an outer glass jacket and internal glass coils. Provisions were made for admitting vinylidene chloride and a mixture of oxygen and halogen through two 4 mm. i.d. inlet tubes at the bottom of the reactor. The product condensed was taken out the bottom of the reactor, while the unreacted gases were vented through the top of the reactor to a separate condenser. Irradiation was provided by three 275 watt sunlamps along the length of the reactor producing light of 3,000 A. and longer wavelength ($h\nu$). The total volume of this reactor was approximately 0.25 liters which, knowing the total through-put of starting materials in moles or liters per hour, allowed calculation of the approximate residence time in the reactor.

In Example 3, the reactor was of the same design except that the inner diameter and length were expanded to 14 cm. and 76 cm., respectively. This reactor had a vapor space of approximately 5.8 liters. Irradiation was provided by a 2,000 watt medium pressure mercury arc lamp placed in a Pyrex well along the length in the center of the reactor.

For Examples 6 to 9 below, the reactor, approximately 0.25 liters volume, was lacking the outer cooling jacket. The starting materials were admitted through the top of the reactor and the vapor and liquid were vented and separated at the bottom. Irradiation in Example 6 was provided by a 450 watt medium pressure mercury arc lamp placed vertically and parallel to the reactor about 4 inches away.

In Examples 7 and 8 the reactor consisted of a straight tube, 2 cm. in diameter and 45 cm. long. The reactor was heated to the temperature shown by means of three infrared heating lamps. The reactants were admitted as vapors at the top of the reactor and condensible products and starting materials were collected at the bottom. Irradiation was provided as in Example 6.

In Example 5 the reactor consisted of a water-jacketed tube 1.5 cm. by 50 cm. long. The halogen-oxygen-nitrogen mixture was admitted along the length of a glass tube fitted inside and in the upper half of the reactor, said tube being 0.5 cm. in diameter, 25 cm. long and containing pinholes approximately 1 mm. in diameter at 1 cm. intervals upwards from the closed bottom. The vinylidene chloride was admitted as a vapor at the top of the reactor and allowed to diffuse downward along the halogen inlet tube. The products were collected at the bottom and unreacted vapors were vented. $ClF_3$ is capable of igniting vinylidene chloride-oxygen mixtures in the absence of sufficient cooling area. Nitrogen (7.7 moles/hr.) was used as a diluent to moderate the reaction.

In Examples 10–12 the reactor consisted of a stainless steel pipe 5 cm. by 30.5 cm. capped at the top with a 0.002 inch thick sheet of nickel. The vinylidene chloride vapor and oxygen, or oxygen and chlorine, were metered in through two fittings just below the top of the reactor. The liquid and gaseous product mixture was vented through a fitting in the bottom cap of the pipe reactor. The vented mixture was led to a glass condenser where liquid and vapor separation was effected. This reactor had copper tubing coils wrapped around the outside through which water (60° C.) was circulated. The reactor was placed beneath a beam of ionizing radiation which entered through the nickel cover.

Analysis was by vapor phase chromatography in all cases.

We claim:

1. In the process of preparing chloroacetyl chloride which comprises reacting by contacting, at a temperature of about 20° to 350° C., vinylidene chloride with $O_2$ in the presence of a free radical initiator, the improvement of carrying out said process in the vapor phase.
2. The process of claim 1 wherein said process is conducted at a pressure of up to three atmospheres.
3. The process of claim 1 wherein the process is a continuous one.
4. The process of claim 2 wherein the initiator is phosgene plus ionizing radiations.
5. The process of claim 2 wherein the initiator is ionizing radiation.
6. The process of claim 2 wherein the initiator is $ClF_3$.
7. The process of claim 2 wherein the initiator is $F_2$.
8. The process of claim 2 wherein the initiator comprises a halogen plus ionizing radiation.
9. The process of claim 3 wherein the halogen is $Cl_2$.
10. The process of claim 3 wherein the halogen is $Br_2$.
11. The process of claim 3 wherein the halogen is $I_2$.

TABLE

| Example Number | $V_2$, m./hr. | $O_2$, m./hr. | Catalyst | Catalyst, m./hr. | Temp., °C. | $V_2$, m. % conv. | C.A.C.* m. percent yield | Other products, mole percent |
|---|---|---|---|---|---|---|---|---|
| 1 | 1.96 | 1.72 | $Br_2+h\mu$ | 0.34 | 108 | 79.5 | 68.8 | 7.0% bromoacetyl chloride; 6.9% 1,1,1-trichloro-2-bromoethane; 17.3% 1,1-dichloro-1,2-dibromoethane. |
| 2 | 1.96 | 1.38 | $Cl_2+h\mu$ | 0.34 | 110 | 98.0 | 83.7 | 16.3% 1,1,1,2-tetrachloroethane. |
| 3 | 21.6 | 12.6 | $Cl_2+h\mu$ | 0.48 | 122 | 100 | 100 | None. |
| 4 | 1.96 | 1.38 | $Br_2+Cl_2+h\mu$ | 0.18 $Br_2$– 0.18 $Cl_2$ | 110 | 76.3 | 7.3 | 5.6% 1,1,1,2-tetrachloroethane; 4.5% bromoacetyl chloride; 7.0% 1,1,1-trichloro-2-bromoethane; 5.6% 1-1-dichloro-1,2-dibromoethane. |
| 5 | 2.0 | 1.4 | $ClF_3$ | 0.005 | 50 | 33 | 21.3 | 78.7% fluorinated compounds. |
| 6 | 0.89 | 0.62 | $COCl_2+h\mu$ | 0.45 | 65-90 | 82.5 | 100 | None. |
| 7 | 2.0 | 1.4 | $CCl_4+h\mu$ | 0.33 | 220 | 9 | 100 | Do. |
| 8 | 2.0 | 1.4 | $BrCCl_3+h\mu$ | 0.17 | 177 | 20 | 100 | Do. |
| 9 | 2.0 | 1.4 | $NO_2$ | 0.34 | 25 | 5.5 | 71 | 29% unidentified product. |
| 10 | 2.0 | 1.5 | Ionizing** radiation. | | 60 | 57.4 | 100 | None. |
| 11 | 2.0 | 1.5 | $Cl_2$ plus ionizing radiation. | $Cl_2$–0.34 | 60 | 74.8 | 80.2 | 19.8% 1,1,1,2-tetrachloroethane. |
| 12 | 2.0 | 1.5 | $Cl_2$ plus ionizing radiation***. | $Cl_2$–0.34 | 60 | 10.8 | 9.3 | 90.7% 1,1,1,2-tetrachloroethane. |

*Chloroacetyl chloride.
** 100 $\mu$a of 2 mev. electrons from a Van de Graaff generator.
*** Radiation produced by bombarding tungsten target with 2 mev. electron beam of 250 $\mu$a.

* * * * *